2 Sheets—Sheet 1.
SMITH & SAVAGE.
Manufacture of Sulphuric Acid.
No. 41,647. Patented Feb. 16, 1864.
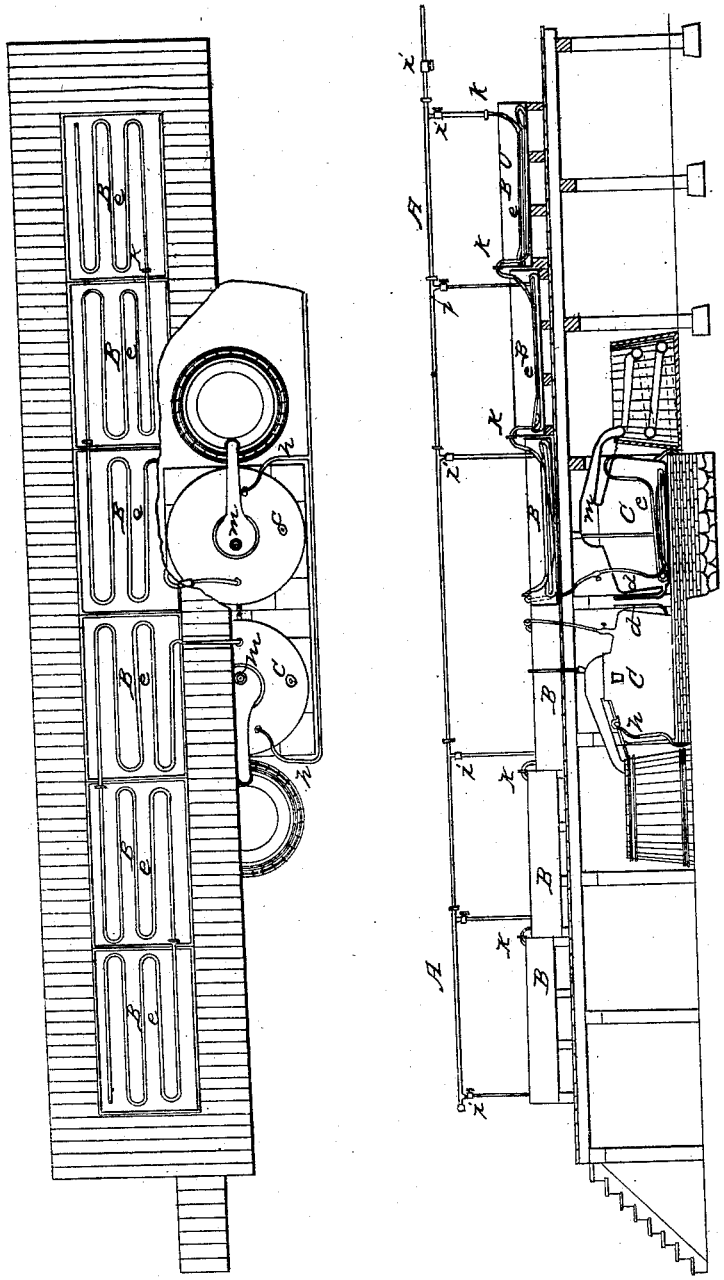
WITNESSES:
INVENTOR:

SMITH & SAVAGE.
Manufacture of Sulphuric Acid.
No. 41,647.
2 Sheets—Sheet 2.
Patented Feb. 16, 1864.
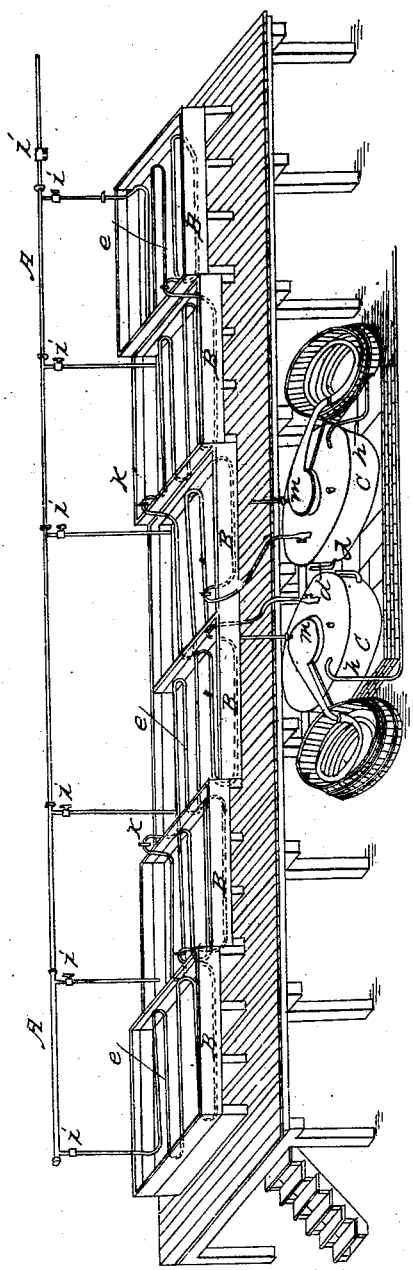
WITNESSES:
INVENTOR:

UNITED STATES PATENT OFFICE.

JOHN SMITH AND JOHN RICHARD SAVAGE, OF PHILADELPHIA, PENNSYLVANIA.

IMPROVEMENT IN THE MANUFACTURE OF SULPHURIC ACID.

Specification forming part of Letters Patent No. 41,647, dated February 16, 1864.

*To all whom it may concern:*

Be it known that we, JOHN SMITH and JOHN RICHARD SAVAGE, of the city of Philadelphia, in the State of Pennsylvania, have invented an Improvement in the Manufacture of Sulphuric Acid; and we do hereby declare that the following is a full and exact description thereof, reference being had to the accompanying drawings, and to the letters of reference marked thereon.

Our invention consists in concentrating sulphuric acid by subjecting it to the action of steam-heated leaden worms in leaden pans; also, by introducing the acid to a still containing a steam-heated leaden worm, as fully described hereinafter, thereby effecting a great saving in the expense of manufacturing this important article of commerce.

In order that the mode of carrying out our invention, and the advantages of the same may be thoroughly understood, we will proceed to describe, in the first instance, the usual mode of concentrating sulphuric acid. When the acid in the bottom of what are termed the "receiving-chambers" has reached a density of 50° Beaumé, it is drawn off and permitted to flow into large rectangular pans of sheet-lead, which is turned up so as to give them a depth of eight or nine inches. These are placed upon plates or tiles over a fire-place, the flue of which is extended under other pans arranged in successive steps toward the chimney. In these the acid is evaporated by the heat of the flame beneath the plates, and is gradually transferred by siphons from the upper to the lower pans till in the lowest it has acquired a density of about 61° Beaumé. To raise the acid to the strength of concentrated oil of vitriol of commerce it has been deemed necessary hitherto to make use of glass retorts or stills of platinum placed above a wood or coal fire. After the acid has reached a density of about 66° Beaumé, it is withdrawn through glass siphons and received into the glass carboys. This method of concentrating sulphuric acid is most expensive, for the following reasons: First, the leaden pans are soon deteriorated by the direct action of the fire, and have to be constantly repaired or replaced; second, glass stills, although protected by iron casings, are constantly liable to fracture, which not only causes a delay in the process of concentration, but involves the expense of replacing them with new ones and the loss of expensive quantities of acid; third, platinum stills are very costly, as one of moderate dimensions suitable for the purpose cannot be purchased at a less cost than twelve thousand dollars; fourth, the necessity of maintaining a fire of uniform heat beneath the pans and stills demands the consumption of a large amount of fuel.

The object of our invention, which we will now proceed to describe, is to concentrate the acid to the desired density at less expense than by the usual process.

Of the accompanying drawings, Sheet No. 1 contains a plan view and side view, partly in section, of apparatus for carrying out our mode of concentrating sulphuric acid, and Sheet No. 2 represents a perspective view of the apparatus.

B B B are three rectangular leaden pans, resting on a suitable frame-work of wood or other foundation, the three pans being arranged in juxtaposition to each other, but one elevated a short distance above the other, and the lowest pan being situated near the still C, which is made of lead, and which rests on a suitable foundation.

A is a horizontal steam-pipe, situated above the pans B, and from this pipe project vertical pipes, each of which communicates with a leaden worm, $c$, deposited in each pan. Although we have shown the worm in the drawings as consisting of one layer of coiled pipes, we make use of a number of layers, arranged one above the other, so that an extended heating-surface may be obtained. Each of these vertical pipes is furnished with a valve or stop-cock, $i$, for shutting off the steam when an accident occurs to any of the worms. The worm of the lowest pan is continued over the edge of the latter, passes through the top of the still, and communicates with a leaden worm at the bottom of the same, the end of this worm also passing through the top of the still and communicating with the waste-steam pipe $h$. The mouth of the still communicates with a worm in a vat or reservoir containing water, as usual. From the still near the bottom of the same projects a vertical pipe, $d$, for receiving the instrument for ascertaining the density of the acid. Steam of about sixty pounds pressure to the square inch is introduced into the pipe A from an adjacent boiler, and is permitted to circulate freely through the worms of the several pans and through the worm in the still. The acid which passes from the receiving-chamber into the highest pan, and thence to the lower pans, is thus subjected to the heated worms, and by this heat the acid on reaching the lowest pan is concentrated to 61° Beaumé from 50° Beaumé, (its density on flowing into the upper pan from the chambers,) and at the same time is freed from the presence of nitric acid. From the lowest pan the acid is introduced through a funnel, $m$, by means of a siphon, into the still, and by the heated worm in the same is concentrated to a density of 66° Beaumé.

It has been generally supposed that to continue the concentration of sulphuric acid beyond a given density in leaden vessels would endanger the latter and contaminate the acid by its taking up and permanently retaining a portion of the lead, and this is doubtless the case when the lead is exposed to the direct action of the ignited fuel contained in close fire-places, the lead being thus unduly heated and in a condition to be injured by the acid. We have discovered, however, that the acid concentrated to the desired density in leaden vessels by steam-heated worms, as described above, is pure, colorless, and free from the presence of lead.

We have illustrated in the drawings two sets of concentrating-pans and two stills, so that two operations are going on at the same time. In like manner additional apparatus may be used, and the extent of operation increased at pleasure.

It will be evident without further description that as we dispense with the usual fires, with the usual elaborate fire-places and flues, with the friable glass stills, and the more expensive platinum stills, our improved mode of concentrating sulphuric acid results in a vast saving of expense.

We wish it to be understood that we do not desire to claim, broadly, the concentrating of sulphuric acid by subjecting it to steam-heated surfaces; but

We claim as our invention, and desire to secure by Letters Patent—

1. Concentrating sulphuric acid by subjecting it to the action of steam-heated worms in leaden pans, as described.

2. Concentrating the acid to a greater density by introducing it to a still containing a steam-heated worm, as specified.

JOHN SMITH. [L. S.]
JOHN RICHARD SAVAGE. [L. S.]

Witnesses:
EDWIN F. DURANG,
ELIJAH THOMAS.